United States Patent [19]
Maruyama

[11] 3,716,242
[45] Feb. 13, 1973

[54] TAPE DRIVE REVERSAL MECHANISM FOR TAPE RECORDER

[75] Inventor: Yoshio Maruyama, Tokorozawa, Japan

[73] Assignee: Pioneer Electronic Corporation, Tokyo, Japan

[22] Filed: Sept. 29, 1970

[21] Appl. No.: 76,576

[30] Foreign Application Priority Data

Sept. 29, 1969 Japan ................................44/76900

[52] U.S. Cl. ....................................................274/4 D
[51] Int. Cl. ............................................G11b 15/20
[58] Field of Search....226/49, 50; 274/4 R, 4 D, 4 B, 274/4 C; 242/199–201

[56] References Cited

UNITED STATES PATENTS

| | | | |
|---|---|---|---|
| 3,490,666 | 1/1970 | Takashino | 226/50 X |
| 3,533,633 | 10/1970 | Wilder | 274/4 D |
| 3,070,321 | 12/1962 | Bara | 226/50 X |

*Primary Examiner*—Harry N. Haroian
*Attorney*—Sughrue, Rothwell, Mion, Zinn & Macpeak

[57] ABSTRACT

A tape drive reversal mechanism for a tape recorder using two reels is initiated by actuation of a plunger and the like. In response to the actuation of the plunger, an eccentric cam is rotated in either clockwise or counterclockwise direction a certain angle alternatively and locked in position, whereby, through appropriate mechanisms, driving of either one of the two reels is effected, and a head and one of pinch rollers are set in operative position or out of operation.

5 Claims, 7 Drawing Figures

TAPE DRIVE REVERSAL MECHANISM FOR TAPE RECORDER

BACKGROUND OF THE INVENTION

1. Field of the Invention

This invention relates to a tape recorder and, more particularly, to a drive mechanism enabling a tape recorder to effect round-trip recording and reproducing.

2. Description of the Prior Art

Hitherto, there have been offered a great variety of tape drive reversal mechanisms, but these mechanisms are complex and bulky, so that there rises many problems in the course of manufacturing and repairing when such a mechanism of the prior art is applied to a tape recorder using a small tape cartridge of the two reel type or employing commonly used present-day reels.

Moreover, because of high cost of such reversal mechanisms, there are on the market a small number of tape recorders for small size cartridges which include a tape drive reversal mechanism. Thus, in order to effect reverse feeding, many tape recorders require the user to take out the cartridge, to turn it over and to re-insert it into the recorder. To this end, some tape recorders possess a simple mechanism for indicating the termination of tape wind up.

SUMMARY OF THE INVENTION

The present invention provides a tape drive and reversal mechanism for a tape recorder which uses a cartridge of small size and which operates reliably. The present invention further provides a system by which the parts of the tape recorder are switched into a forward feed position or into a reverse feed position in response to a clockwise or counterclockwise rotation of an eccentric cam to a predetermined angle.

It is another object of the present invention to provide a system in which, in response to the rotation to a certain angle of an eccentric cam, driving of tape reel shafts is achieved with the aid of a cam face of the eccentric cam, and movement of a magnetic head and the pressing of pinch rollers against driving capstans with the aid of pins on the eccentric cam is further accomplished.

The present invention also provides a drive mechanism of the above type in which the eccentric cam is locked in the rotated positions during recording and reproducing operations of the tape recorder. This lock mechanism normally does not need energy, thus, there is no need of a retention force to sustain the tape drive state.

In particular, the present invention resides in a mechanism of the type in which an eccentric cam is rotated either clockwise or counterclockwise at a certain angle in response to actuation of a plunger and the like and then is locked in that position. The position of a pulley mounted directly or indirectly on one end of a lever, the other end of which touches an eccentric face of the cam, is changed to thereby alternatively drive the two reels. By pins secured on the cam plate, a head and one of the pinch rollers are set in an operative position or moved out of engagement, depending upon the rotating direction.

DESCRIPTION OF THE PREFERRED EMBODIMENT

Figure 1:
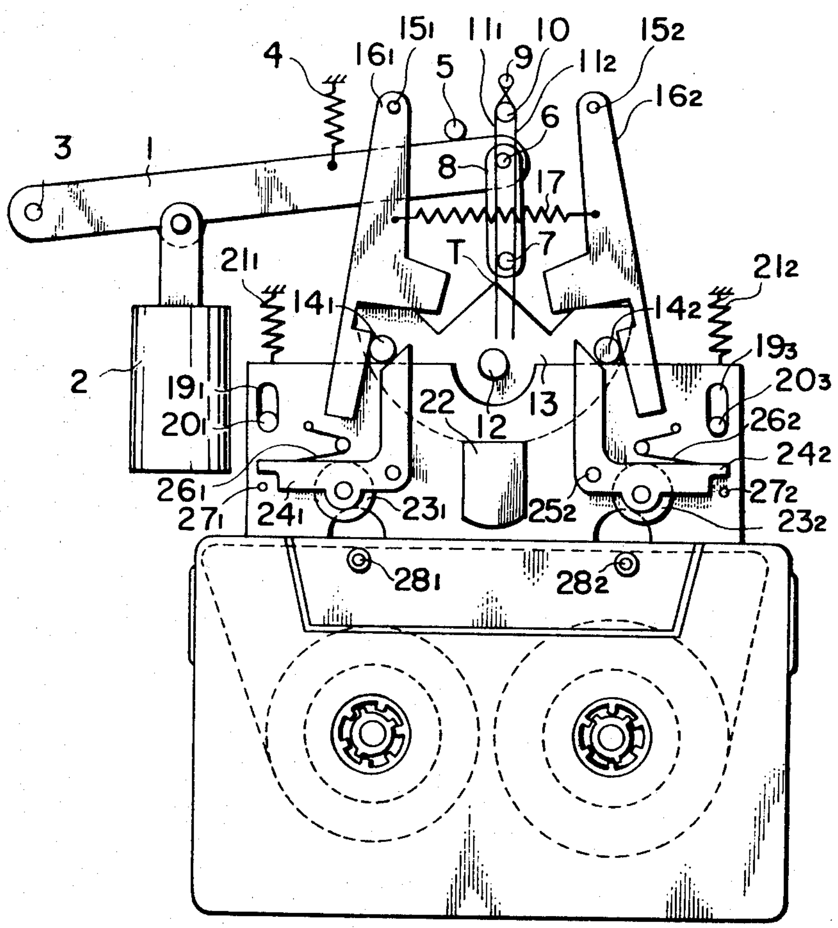
FIG. 1 is a plan view of a tape drive reversal mechanism in accordance with the present invention where the mechanism is in a neutral position and a cartridge is set in position within the tape recorder.
Figure 2:
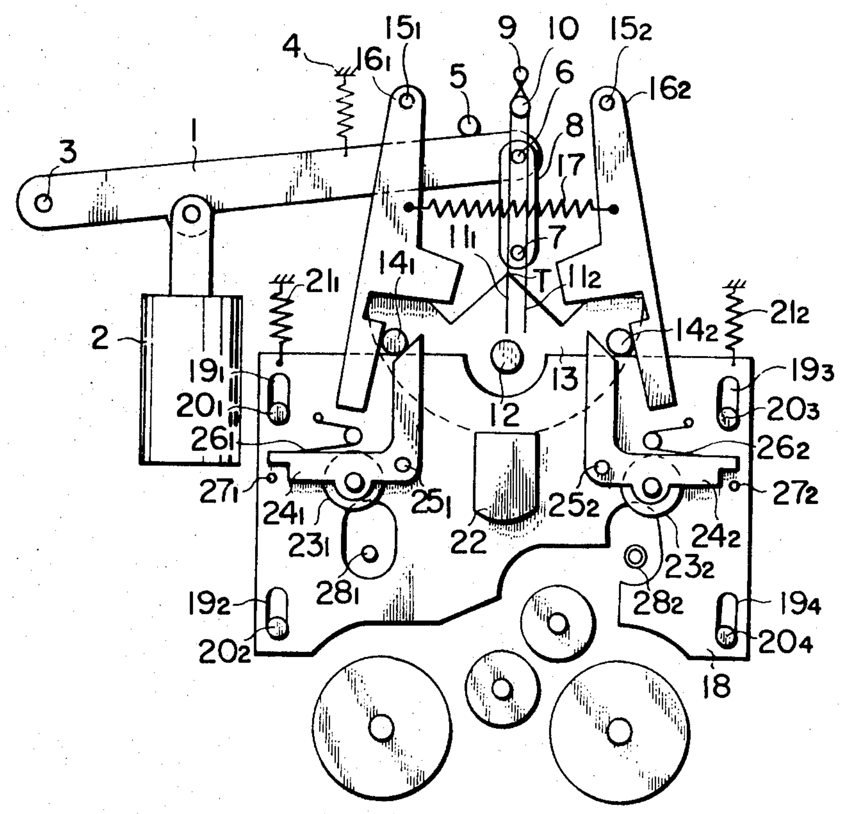
FIG. 2 is a view similar to FIG. 1 but with the cartridge removed.
Figure 3:
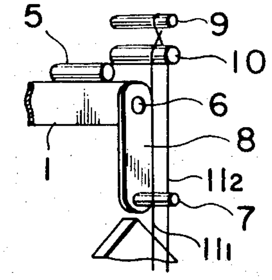
FIG. 3 is a perspective view of the mounting arrangement of the wire springs.

Referring to FIGS. 1 and 2, upon actuation of a plunger 2 a lever 1 moves away from a stop member 5 while pivoting at 3 under the resisting bias of a pring 4 and moves downwardly. On the end of the lever 1 is mounted a push arm 8 through a pivot 6. Arm 8 carries a push pin 7, as shown in FIG. 3. Wire springs $11_1$ and $11_2$ are secured to a pin 9, have their direction of action controlled by a pin 10, and normally position the push pin 7 on the extension of the straight line connecting the pins 9 and 10 so long as no external force is applied directly thereto. Then as the lever 1 advances due to actuation of the plunger 2, the push pin 7 on the push arm 8 advances in a straight line constituting the extension of the line connecting the pins 9 and 10, while being held on both sides by the wire springs $11_1$ and $11_2$. It touches the right side angular face of an eccentric cam plate 13, pivoted on shaft 12 located slightly left of the extension. It slides on the angular face while resisting the sidelong urging of the wire spring $11_2$, and reaches the right side V-shaped portion, and, then pushes the V-shaped portion to thereby cause the eccentric cam plate 13 to rotate in a clockwise direction, as seen in FIG. 2.

This eccentric cam plate 13 has at its upper portion the angular face including symmetrical, V-shaped portions. Push pins $14_1$ and $14_2$ are provided on the plate. Lock levers $16_1$ and $16_2$ are pivoted, respectively, on pivots $15_1$ and $15_2$ and located symmetrically with respect to the eccentric cam shaft 12 with their locking recesses facing inward, and are, respectively, in contact with the push pins $14_1$ and $14_2$ on the cam plate by the tension of spring 17.

A head plate 18, guided by guide pins $20_1$, $20_2$, $20_3$and $20_4$ engaging its elongated holes $19_1$, $19_2$, $19_3$ and $19_4$ is urged against the push pins $14_1$ and $14_2$ on the cam plate 13 by tension of springs $21_1$ and $21_2$. On the head plate 18, there are mounted symmetrically with a head 22 as the center, bell cranks $24_1$ and $24_2$ carrying, respectively, pinch rollers $23_1$ and $23_2$ by means of pivot mounts $25_1$ and $25_2$. These bell cranks are, respectively, urged at one end by springs $26_1$ and $26_2$ and held stationary at their other ends by abutting against the push pins $14_1$ and $14_2$ on the cam plate 13.

Figures 4, 5:
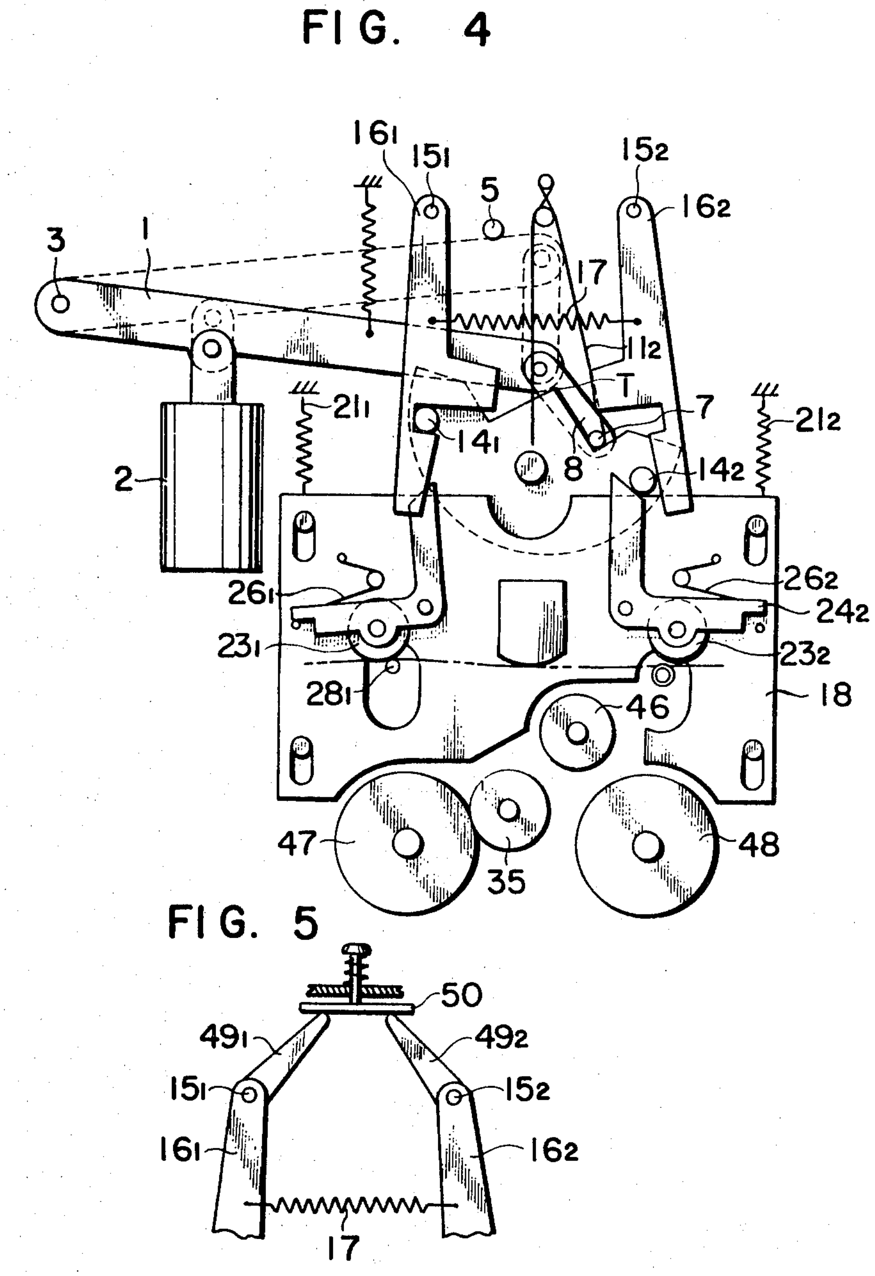
FIG. 4 is a similar view to that of FIG. 2 showing the situation where the cam is rotated in a clockwise direction and locked in position.
FIG. 5 is a plan view of the mechanism to unlock the cam and to return the same to its neutral position.

As shown in FIG. 4, when either one of the pins $14_1$ and $14_2$ is spaced apart from the edge of the head plate 18, one end of the corresponding bell crank touches either stop member $27_1$ or $27_2$ by the bias of spring $26_1$ or $26_2$, and are thus held stationary.

As the rotation of the eccentric cam plate 13 due to the pin 7 continues in a clockwise direction, as shown in FIG. 4, the push pin $14_2$ on the eccentric cam plate 13 operates to move the head plate 18 so that the plate advances against the resisting action of springs $21_1$ and $21_2$, being guided by the guide pins $20_1$, $20_2$, $20_3$, and $20_4$. Further, this push pin is abutting against one end of the bell crank $24_2$, so that it prevents the pinch roller $23_2$ mounted on the crank lever $24_2$ from touching a capstan $28_2$.

The left side push pin $14_1$ on the eccentric cam plate 13 moves away from the head plate 18 and from one end of the bell crank $24_1$ in response to the clockwise rotation of the cam plate. It slides upwardly on the inner face of the lock lever $16_1$, and falls into the locking recess to thereby stop the clockwise rotation of the eccentric cam plate 13. Thus, due to the movement of the head plate 18 owing to the push pin $14_2$ and the detachment of the push pin $14_1$ from one end of the bell crank $24_1$, a pinch roller $23_1$ mounted to the bell crank $24_1$ is urged by spring $26_1$ to abut against a capstan $28_1$ under pressure.

In FIG. 4, if the operation of the plunger is stopped after the push pin $14_1$ has been locked in the lock lever $16_1$ by the clockwise rotation of the eccentric cam plate 13 and the movement of the eccentric cam plate 13 has stopped, the lever 1 is pulled by the spring 4 and returns to the position shown in dotted lines where it abuts against the stop member 5, and the push pin 7 returns to the extension of the straight line connecting the pins 9 and 10 while maintained by the wire springs $11_1$ and $11_2$.

Where the eccentric cam plate 13 has been rotated in a clockwise direction and locked in position, an angular portion T located in the center of the upper angular face, as viewed in FIG. 4, positions itself to the right side of the extension of the line connecting the pins 9 and 10, so that in response to the succeeding actuation of the plunger, the push pin 7 slides on the upper left side angular face of the eccentric cam plate 13 and moves to the left. Then, the push pin 7 abuts first against the right side projection of the lock lever $16_1$ and pushes the lock lever $16_1$ to the left, to thereby release the push pin $14_1$ from locked position. The push pin 7 continues to slide and then abuts against the left side V-shaped portion and fits therein to thereby cause the eccentric cam plate 13 to rotate in a counterclockwise direction. As the result, push pin $14_1$, in place of the push pin $14_2$, advances to push the head plate 18 and, then, stops when the push pin $14_2$ is locked in the recess of the right side lock lever $16_2$.

The new state of the bell cranks $24_1$ and $24_2$ on the head plate 18 is contrary to that in the clockwise rotation of the eccentric cam plate 13, that is, the pinch roller $13_2$ is pressed against the capstan $28_2$ and the pinch roller $23_1$ is spaced apart from the capstan $28_1$. As explained hereinabove, if the plunger is actuated when the eccentric cam plate 13 is in neutral position, the eccentric cam plate 13 is locked through its clockwise rotation and, upon the succeeding actuations of the plunger, is rotated alternatively in the clockwise and counterclockwise directions and locked in position.

Hereinafter, the function of the eccentric cam face of the eccentric cam plate 13 will be explained.

Figure 6:
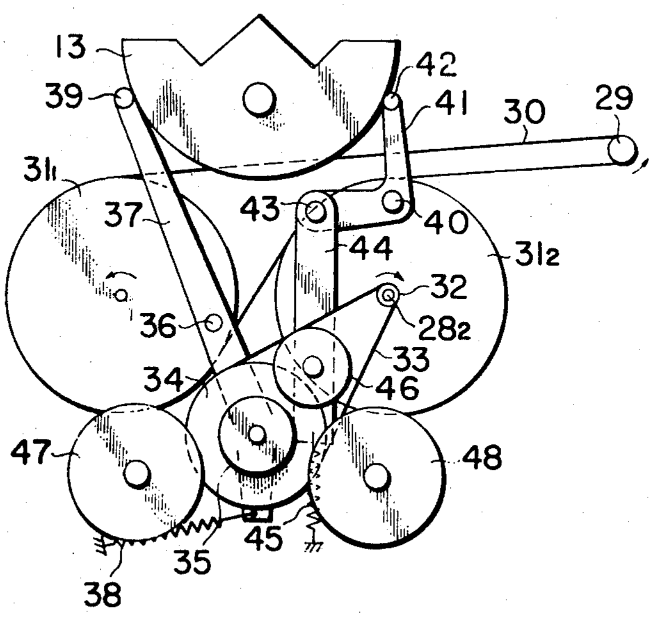
FIG. 6 is a plan view of a portion of the mechanism of FIG. 1 under a drive transfer situation with the cam being in the neutral position.

In FIG. 6, upon rotation of a motor pulley 29 in the arrow direction, pulleys $31_1$ and $31_2$ combined with flywheel structures having capstans $28_1$ and $28_2$ on these rotary shafts rotate in the arrow directions via belt 30. By a pulley 32 integral with the pulley $31_2$ and through a flexible belt 33, pulley 34 is rotated, whereby a pulley 35 integral therewith also rotates.

The combined pulleys 34 and 35 are mounted on one end of a lever 37 pivoted at 36, one end of the lever 37 being pulled to the left, as viewed in FIG. 6, by a spring 38 and a pin 39 secured to the other end thereof abuts against the left side cam face of the eccentric cam plate 13. Against the right side cam face of the eccentric cam plate 13 is a pin 42, provided at one end of a bell crank 41 pivoting at 40. The other end of the bell crank 41 is biased downwardly, as viewed in FIG. 6, by a spring 45 connected to the end of a bar 44 pin connected to bell crank 41 at 43. The bar 44 is provided with an intermediate wheel 46.

Figure 7:
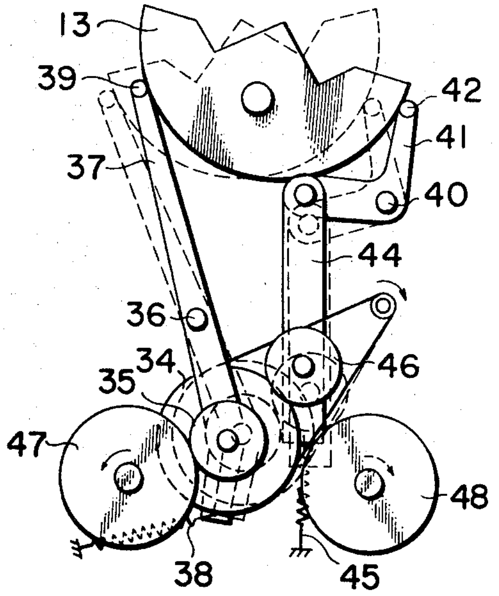
FIG. 7 is a similar plan view to that of FIG. 6 under a drive transfer situation where the can is rotated in a counterclockwise direction and locked in position.

In FIG. 7, when the eccentric cam plate 13 is rotated in a clockwise direction and locked into the position as shown in full lines, the pulley 35 abuts against a left reel driving pulley 47 and rotates the same in the arrow direction counterclockwise.

If the eccentric cam plate 13 is rotated in a counterclockwise direction and locked in position, the parts move into the broken line position, that is, the pulley 35 mounted rotatably on the lever 37 which is pivoted at 36 moves to the right to thereby stop drive transfer to the left side reel driving pulley 47. The intermediate wheel 46 is pulled by the spring 45 and moves downwardly into the position where it is pressed against both the pulley 35 and a right side reel driving pulley 48, so that the rotation of the pulley 35 is transferred through the intermediate wheel 46 to the right side reel driving pulley 48, driving pulley 48 clockwise.

The operation to return the eccentric cam plate 13 to the neutral position after completion of the play is as follows: In FIG. 5, if cam arms $49_1$ and $49_2$ secured to the lock bar $16_1$ and $16_2$ are pushed down by a push plate 50, the recesses of the lock bar $16_1$ and $16_2$ both move outwardly to thereby release a locked push pin $14_1$ or $14_2$, thus, due to tension of the springs $21_1$ and $21_2$ urging the head plate 18 toward the push pins $14_1$ and $14_2$, the eccentric cam plate 13 is returned to the neutral position.

As was explained hereinabove, in accordance with the present invention, there is preferably provided the tape drive reversal mechanism for tape recorders using two reels, which is remarkably simplified and can operate reliably, so that it is easy to incorporate the tape drive reversal mechanism in the small size tape recorders using a cartridge including two reels. Thus, the present invention is very effective in improving the function of the small size tape recorders.

While the preferred embodiment of the present invention has been described herein, it is appreciated that variations and modifications may be made without departing from the spirit of the invention.

What is claimed is:

1. In a tape recorder capable of round-trip or one way recording and/or reproducing and having a magnetic head, individual capstans moving a tape forward or backward, two pinch rollers operatively cooperating with said capstans for feeding the tape, and two reel shafts, the improvement comprising a tape drive reversal mechanism, said mechanism comprising:

a cam plate alternatively rotatable through a certain angle in a clockwise direction and in a counterclockwise direction, (rotating) means for rotating said cam plate alternately in both directions, holding means supporting said magnetic head and movable to a position where said magnetic head contacts the tape in response to rotation of said cam plate, lock means for locking said cam plate in a rotated position, releasing means for releasing said lock means and moving said magnetic head to a position where said magnetic head and said pinch rollers are out of contact with the tape, said holding means further supporting said two pinch rollers, said tape being carried by a wind-up reel and said recorder further comprising transfer means in contact with the cam face of said cam plate for transferring a rotating driving force to said tape wind-up reel in response to rotation of said cam plate, said cam shaft pivotably supporting said cam plate, said cam plate having an eccentric cam face and two immediately adjacent V-shaped peripheral notch portions, said V-shaped peripheral portions being located symmetrically with respect to said cam shaft, said rotating means being operatively associated with said cam plate to move alternately into said V-shaped positions but positioned to effect rotation of the same in alternate directions, said rotatable member comprising a push button, said recorder further comprising a lever pivotably coupled to said push arm, means for oscillating said lever, and guide means for guiding the end of said push arm to guide said push arm alternately into the two V-shaped portions of said cam plate to drive said cam plate, said guide means abutting respective sides of said push pin and extending parallel to the path of movement of said magnetic head and laterally offset from said cam shaft, said cam plate carrying push pins at spaced circumferential locations, said lock means comprising a pair of pivotable levers, pivotably mounted and extending along each side of said cam plate and outside said cam plate push pins with locking recesses facing said pins, means spring biasing said locking levers towards each other, said holding means comprising a spring biased head plate movable towards said tape and against the bias of said spring with said cam plate push pins acting alternatively on said head plate.

2. The tape recorder as claimed in claim 1, further comprising means carried by said head plate for supporting said pinch rollers and causing said pinch rollers to alternately press said tape against respective capstans, spring biasing means normally biasing said pinch roller supporting means to a position where the pinch rollers are free of said tape, and wherein said cam plate push pins acting on said head plate also simultaneously act on said pinch roller supporting means to press the tape against said selective drive capstan.

3. The tape recorder as claimed in claim 2, wherein said pinch roller supporting means comprises bell cranks and said cam plate push pins acting on said head plate also simultaneously act on one end of said associated bell crank.

4. The tape recorder as claimed in claim 1, wherein said push arm comprises a push pin which directly abuts said V-shaped peripheral notch portion, and said guide means comprises flexible wires abutting respective sides of said push pin.

5. The tape recorder as claimed in claim 3, wherein said push arm comprises a push pin which directly abuts said V-shaped peripheral notch portion, and said guide means comprises flexible wires abutting respective sides of said push pin.

* * * * *